(12) United States Patent
Izquierdo Gil et al.

(10) Patent No.: US 8,723,354 B2
(45) Date of Patent: May 13, 2014

(54) ELECTRICAL POWER CONTROL SYSTEM FOR A VEHICLE

(75) Inventors: Daniel Izquierdo Gil, Parla (ES);
Ricardo Azcona Fernandez, Madrid (ES); Francisco Javier Lopez Del Cerro, Getafe (ES)

(73) Assignee: Eads Construcciones Aeronauticas, S.A., Madrid (ES)

( * ) Notice: Subject to any disclaimer, the term of this patent is extended or adjusted under 35 U.S.C. 154(b) by 656 days.

(21) Appl. No.: 13/028,640

(22) Filed: Feb. 16, 2011

(65) Prior Publication Data

US 2012/0091789 A1 Apr. 19, 2012

(30) Foreign Application Priority Data

Oct. 15, 2010 (EP) .................................... 10382268

(51) Int. Cl.
*B60L 1/00* (2006.01)
*B60L 3/00* (2006.01)
*H02G 3/00* (2006.01)

(52) U.S. Cl.
USPC ......................................................... 307/9.1

(58) Field of Classification Search
USPC ........................ 307/9.1, 18, 34; 244/53 R, 60
See application file for complete search history.

(56) References Cited

U.S. PATENT DOCUMENTS

2008/0303353 A1* 12/2008 Yu et al. ........................ 307/131

* cited by examiner

*Primary Examiner* — Carlos Amaya
(74) *Attorney, Agent, or Firm* — Oblon, Spivak, McClelland, Maier & Neustadt, L.L.P.

(57) ABSTRACT

An Electrical Power System for supplying electrical power to the loads of a vehicle comprising a Power Generation Area (11); a Primary Distribution Area (13); a Secondary Distribution Area (15) including Electrical Power Load Management Units (EPLMUs) (17, 17', 17", 17''') that comprise a Control Board (31) and one or more SSPCs (33) for groups of loads (19, 19', 19", 19'''); and a master EPLMU (21) that comprise a Control Board (32) and one or more SSPCs (33), powered from the Primary Distribution Area (13) and connected to said EPLMUs (17, 17', 17", 17''') by power supply lines and by a data communication bus (26), and a Load Management Computer (25) connected to said data communication bus (26); said master EPLMU (21) and said Load Management Computer (25) being suitable arranged for full control of the start up and the shutdown of said EPLMUs (17, 17', 17", 17''').

8 Claims, 3 Drawing Sheets

ELECTRICAL POWER CONTROL SYSTEM FOR A VEHICLE

FIELD OF THE INVENTION

The present invention relates to an electrical power control system for a vehicle and, more in particular, to a system for the protection, control and management of the secondary distribution area using solid state power controllers modules.

BACKGROUND

There is a strong trend in the aeronautical industry towards the More Electric Aircraft (MEA) concept as a consequence of substitutions of conventional equipments which depend on pneumatic, mechanic and hydraulic power by equipments that depend on electrical power which provide a better system performance due to increase of reliability, less maintenance, efficiency on energy conversion and therefore also higher efficiency of aircraft in general.

To cope with this increase of electrical power in the new distribution architectures, higher voltage levels are used for reducing the current levels and consequently the section of the wires and its weight. On the other hand, the major electrical loads can be powered directly from direct current instead of alternating three-phase current, which also means a decrease in the number of the wires that are used to connect the different electrical loads.

This considerable growth of the number of electrical loads in these new electric distribution architectures has contributed to an increase of the quantity of the electrical and electronic components, which could conduce to instability of the whole system due to the interactions between the different equipments that compose the system. Also, raising the level of voltage provokes the appearance of new problems regarding the function of some devices, such as conventional protections and other inconveniences originated by physical effects in the wires with the new levels of voltage: corona effect, arc fault and others.

In the aeronautical industry there is an increasing demand for Electrical Power Systems managed by smart control systems for, particularly, managing the connection and disconnection of the electrical loads depending on the operational mode and available power sources.

As a consequence, solid state power controllers (SSPCs) technology has been introduced inside the electrical management centers. These components have been grouped in Electrical Power Load Management Units (EPLMUs) which offer a number of advantages over electromechanical relays and conventional circuit breakers (CBs).

Other SSPC characteristics are high reliability, low power dissipation and remote control capability by means of complex hardware. Moreover, the devices based on power semiconductors, like the SSPCs, provide fast response and lower susceptibility to vibrations in comparison to electromagnetic and electro-mechanic components, such as CBs.

FIG. 3 shows a schematic view of a known EPLMU 17 based on SSPCs 33 with a Control Board 31 and input lines 22, 23, 26 for power supply and control (data communication).

The control of EPLMUs is usually done through a centralized Load Management Computer (LMC). The local control circuitry on each EPLMU is usually done via an internal data bus inside the Line Replacement Unit (LRU). Thus, SSPCs provides system intelligence, remote control and monitoring, less maintenance, less power dissipation, weight reduction and high reliability.

United State Patent Application US 2007/0081284 discloses a power control system based on SSPCs and conventional CBs. However, its design utilizes conventional CBs to provide power to some electrical loads, such as SSPC modules. Therefore, this architecture is limited to basic control and monitoring capability, and does not permit reduce volume and space.

Therefore it is desired to have an electrical secondary power system totally based on electronic components, such as SSPCs.

This invention is intended to the attention of this demand.

SUMMARY OF THE INVENTION

It is an object of the present invention to provide an Electrical Power Control System for a vehicle based only in SSPCs.

It is another object of the present invention to provide an Electrical Power Control System for a vehicle having an optimized Secondary Power Distribution Area.

These and other objects are met by an Electrical Power System for supplying electrical power to the loads of a vehicle comprising at least a Power Generation Area, a Primary Distribution Area and a Secondary Distribution Area including Electrical Power Load Management Units (EPLMUs) that comprise a Control Board and one or more SSPCs for groups of loads, also comprising a master EPLMU that comprise a Control Board and one or more SSPCs, powered from the Primary Distribution Area and connected to said EPLMUs by power supply lines and by a data communication bus, and a Load Management Computer connected to said data communication bus, said master EPLMU and said Load Management Computer being suitable arranged for full control of the start up and the shutdown of said EPLMUs.

Preferably the master EPLMU is provided with an auto-configuration capability implemented in its hardware (typically built-in in a single Starting Card) for energizing the slave EPLMUs when starting up. No intermediate protection for the EPLMUs is thus needed.

Preferably said master EPLMU comprises two input power supply lines for the SSPCs and one specific input power supply line for its Control Board for avoiding failures.

Preferably said input power lines are connected to separate busbars in the Primary Distribution Area.

A typical field of application of the present invention is the aeronautical field both for manned and unmanned aircrafts given the above mentioned current trend towards a More Electric Aircraft.

Other features and advantages of the present invention will be understood from the following detailed description in relation with the enclosed drawings.

DETAILED DESCRIPTION OF PREFERRED EMBODIMENTS

Figure 1:
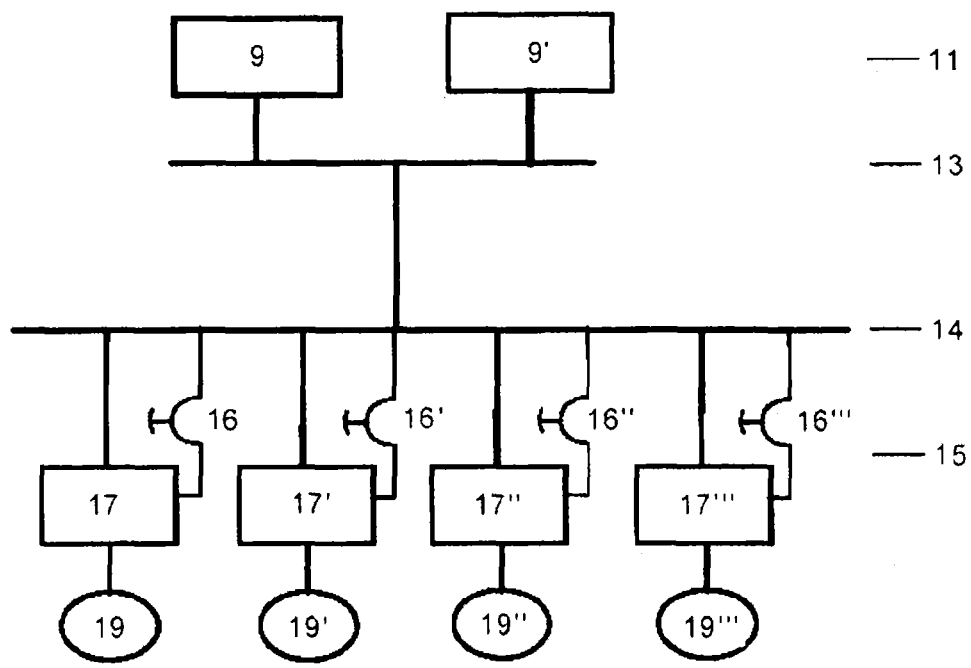
FIG. 1 shows a schematic block diagram of a known Electrical Power System of an aircraft.

In general terms, a known Electrical Power System architecture for a MEA can be divided, as shown in FIG. 1, in five main areas:

A Power Generation Area 11 comprising power sources 9, 9' that provide the electrical power to the rest of the system and to the loads, including at least a battery for supplying the initial electric power for the internal control systems and emergency operation which are integrated inside the equipments that compose the architecture. The Power Generation Area may comprise AC and DC sources.

A Primary Distribution Area 13 that distributes the electric power to all the points and also protects the connected areas from overcurrent by means of smart contactors (SC).

A Conversion Area (not shown) for converting the supply voltage level to the distribution levels required by the electrical loads.

Figure 3:
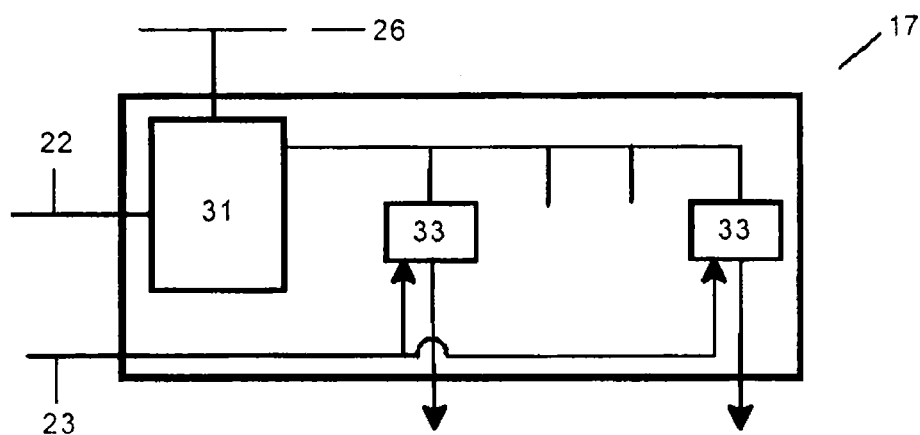
FIG. 3 is a schematic view of an EPLMU based on SSPCs.

A Secondary Distribution Area 15 with a power bus 14 that provides electric power to the groups of loads 19, 19', 19", 19''' through EPLMUs 17, 17', 17", 17''' based on SSPCs 33 (see FIG. 3) instead of conventional devices, such as relays and CBs. As is well known, a SSPC permit replacing the relays and circuit breakers, elements of mechanic nature, for single power electronic devices. These EPLMUs 17, 17', 17", 17''' allow connecting the groups of electrical loads 19, 19', 19", 19''' and provide the functions of switching them and protecting the electric installations from overloads and short circuits, exactly as it is done by relays and CBs. The Control Boards 31 of these EPLMUs 17, 17', 17", 17''' are energized by means of conventional CBs 16, 16', 16", 16'''.

A Management and Monitoring Area (not shown) that controls the correct functioning of all the equipment and devices, depending on the operative sceneries.

Figure 2A:
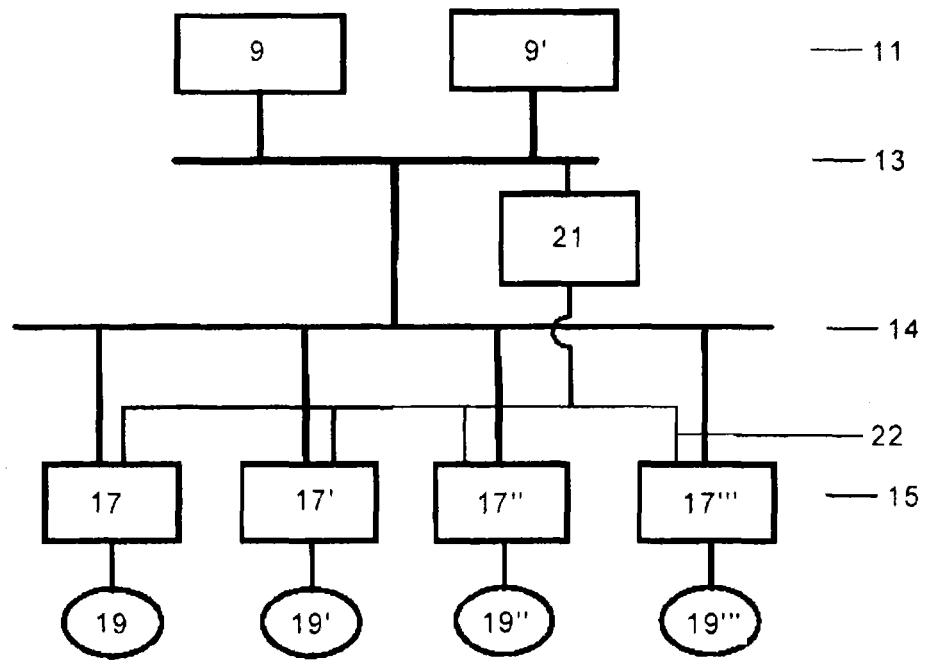
FIG. 2a is a schematic block diagram of an Electrical Power System of an aircraft according to the present invention.
Figure 2B:
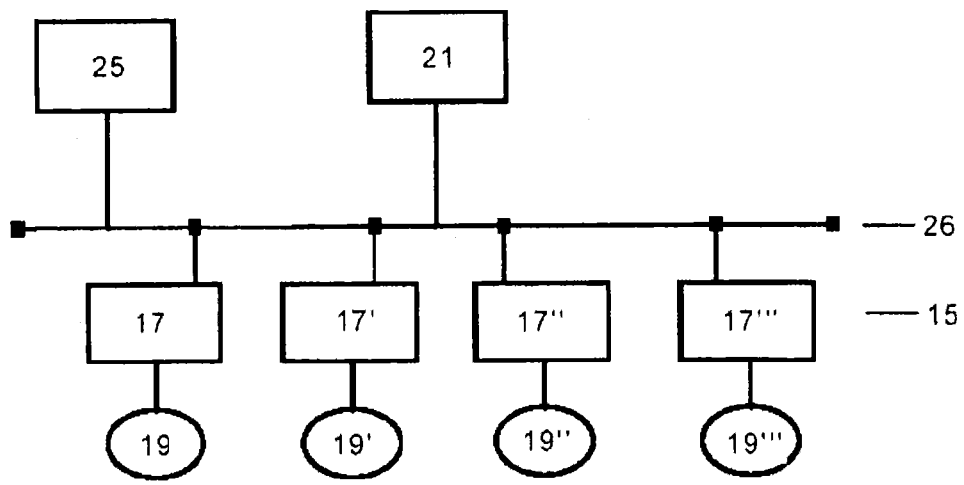
FIG. 2b is a schematic block diagram of the data communication bus for the Secondary Distribution Area of an Electrical Power System of an aircraft according to the present invention.
Figure 4:
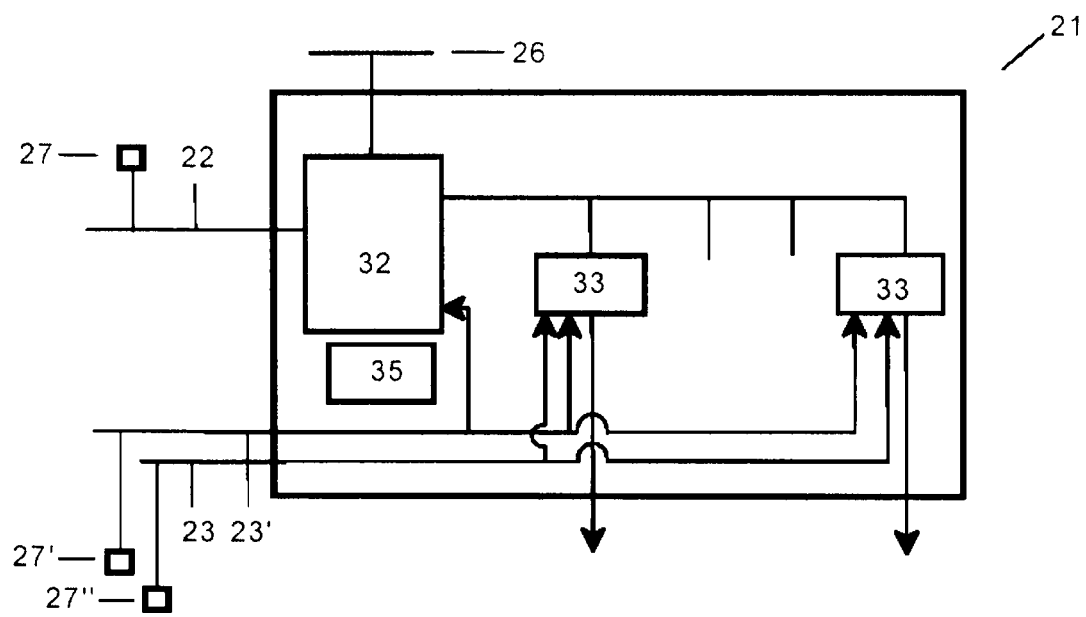
FIG. 4 is a schematic view of a master EPLMU according to a preferred embodiment of the present invention.

An Electrical Power System architecture for a MEA according to the present invention is shown in FIGS. 2a (showing the power supply lines) and 2b (showing the control lines). Its main differences with the known Electrical Power System architecture are:

Includes a master EPLMU 21 connected to the Primary Distribution Area 13 and to the EPLMUs 17, 17', 17", 17''' (becoming thus slave EPLMUs) for controlling its start up and its shutdown. The power supply lines are shown in FIG. 2a and the data bus control lines 26 (handling data communication) are shown in FIG. 2b. The Control Boards 31 of the slave EPLMUs 17, 17', 17", 17''' are energized by means of the master EPLMU 21 that, as shown in the preferred embodiment illustrated in FIG. 4, includes a Control Board 32, a Starting Card 35, two input power lines 23, 23' for the SSPCs 33, two input power lines 22, 23' for the Control Board 32. It is also shown the connection of the Control Board 32 to the data communication bus 26. As the master EPLMU 21 is powered from the Primary Distribution Area 13, preferably from separate busbars 27, 27', 27" as shown in FIG. 4, it shall be located as close as possible from power generation units 9, 9'.

A Load Management Computer (LMC) 25 connected to the data bus 26 controls the correct functioning of all the equipment and devices, depending on the operative sceneries.

The master EPLMU 21 must have an auto-configuration capability when starting up for energizing the slave EPLMUs 17, 17', 17", 17''' independently from LMC 25, in the same manner than a CB. In a preferred embodiment this capability is implemented in the Starting Card 35 hardware. This unit has dual electrical power through dedicated power lines (not shown) and main electrical distribution bus. As said before, in a preferred embodiment the SSPCs 33 are powered by means of two lines 23, 23' in order to avoid lack of power in the slave EPLMUs 17, 17', 17", 17'''.

There is not any specific CB in the Electrical Power System. The master EPLMU 21 replace all CBs used in the prior art systems.

Figure 5:
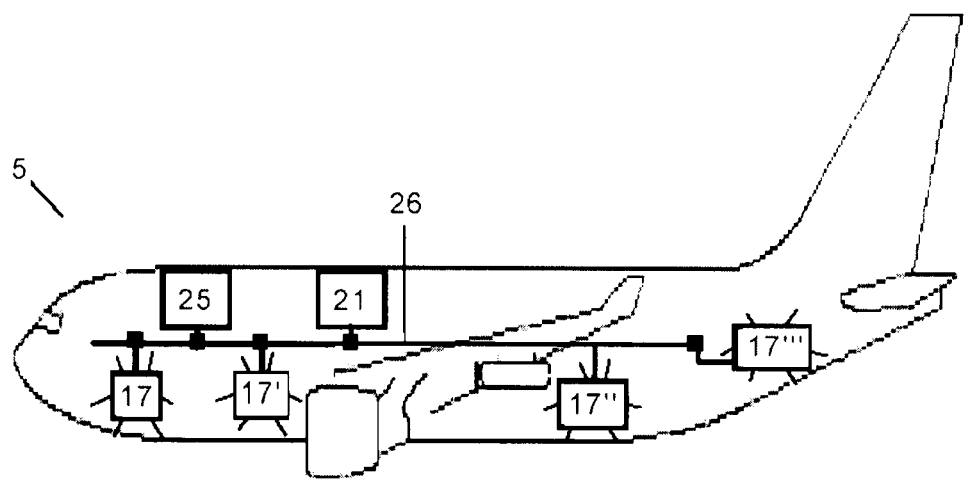
FIG. 5 is a simplified schematic view of an aircraft with an Electrical Power System according to the present invention, showing only the EPLMUs and the data communication bus.

FIG. 5 illustrates schematically the location of master EPLMU 21, LMC 25 and slave EPLMUs 17, 17', 17", 17''' along a tanker aircraft 5 used in aerial refueling operations showing only for simplicity the data bus 26 between them.

The master EPLMU 21 is located close to the power sources, i.e. the aircraft electrical power centers.

LMC 25 is located close to the pilot cabin.

EPLMU 17 is located close to the pilot cabin and manage the group of electrical loads located in this area (cabin equipment, refueling control equipment), EPLMUs 17' and 17" manage the groups of electrical loads located in the aircraft central area and EPLMU 17''' manage the group of electrical loads associated to the refueling device.

From the above description it may be seen that the present invention provides a solution for the implementation of an improved secondary power distribution system that permits total control and monitoring capability and which is more efficient and reliable that prior art systems.

Also, the present invention takes full advantage of the features already built-in as a part of the EPLMUs to simplify the architectures for an aircraft electrical power system, and to optimize and improve the control of the secondary power distribution area. The use of SSPCs to power the EPLMUs in place of CBs, may allow the control and monitoring capability within unmanned vehicles.

Although the present invention has been fully described in connection with preferred embodiments, it is evident that modifications may be introduced within the scope thereof, not considering this as limited by these embodiments, but by the contents of the following claims.

The invention claimed is:

1. An Electrical Power System for supplying electrical power to the loads of a vehicle, comprising:
   at least a Power Generation Area;
   a Primary Distribution Area; and
   a Secondary Distribution Area including Electrical Power Load Management Units (EPLMUs) each having a Control Board and one or more Solid State Power Controllers (SSPCs) for groups of loads;
   a master EPLMU having a Control Board and one or more SSPCs, the master EPLMU being powered from the Primary Distribution Area and connected to said EPLMUs by power supply lines and a data communication bus; and
   a Load Management Computer connected to said data communication bus,
   wherein master EPLMU and said Load Management Computer are arranged to fully control the start up and the shutdown of said EPLMUs.

2. The Electrical Power System according to claim 1, wherein the master EPLMU further includes a Starting Card having implemented therein in hardware an auto-configuration capability to energize slave EPLMUs when starting up.

3. The Electrical Power System according to claim 1, wherein said master EPLMU further includes two input power supply lines for the SSPCs; and two input power supply lines for the Control Board.

4. The Electrical Power System according to claim 3, wherein said input power supply lines for the SSPCs and the Control Board are connected to separated busbars in the Primary Distribution Area.

5. The Electrical Power System according to claim 1, wherein said master EPLMU is located close to at least one source of the Power Generation Area.

6. The Electrical Power System according to claim 1, wherein said vehicle is an aircraft.

7. The Electrical Power System according to claim 6, wherein said aircraft is a manned aircraft.

8. The Electrical Power System according to claim 6, wherein said aircraft is an unmanned aircraft.

\* \* \* \* \*